United States Patent
Gao et al.

(10) Patent No.: US 11,902,522 B2
(45) Date of Patent: Feb. 13, 2024

(54) CHARACTER RESTORATION METHOD AND APPARATUS, STORAGE MEDIUM, AND ELECTRONIC DEVICE

(71) Applicant: ZTE Corporation, Shenzhen (CN)

(72) Inventors: Junping Gao, Shenzhen (CN); Zhenfeng Cui, Shenzhen (CN); Zhen Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/789,651

(22) PCT Filed: Dec. 28, 2020

(86) PCT No.: PCT/CN2020/139945
§ 371 (c)(1),
(2) Date: Jun. 28, 2022

(87) PCT Pub. No.: WO2021/136144
PCT Pub. Date: Jul. 8, 2021

(65) Prior Publication Data
US 2023/0063967 A1    Mar. 2, 2023

(30) Foreign Application Priority Data
Dec. 31, 2019 (CN) .......................... 201911419859.5

(51) Int. Cl.
*G06V 30/148* (2022.01)
*H04N 19/12* (2014.01)
(Continued)

(52) U.S. Cl.
CPC .......... *H04N 19/12* (2014.11); *G06F 40/126* (2020.01); *G06V 10/26* (2022.01);
(Continued)

(58) Field of Classification Search
CPC ............ G06V 30/00–43; G06F 40/126; H04N 2201/3243; H04N 2201/3266
See application file for complete search history.

(56) References Cited

U.S. PATENT DOCUMENTS 4,177,448 A * 12/1979 Brayton ................. G06V 10/20
382/160
5,303,313 A * 4/1994 Mark .................... H04N 1/4115
382/209
(Continued)

FOREIGN PATENT DOCUMENTS

CN      101816177 A     8/2010
CN      102752368 A    10/2012
(Continued)

OTHER PUBLICATIONS

International Search Report for corresponding application PCT/CN2020/139945 filed Dec. 28, 2020; dated Mar. 19, 2021.
(Continued)

*Primary Examiner* — Sean T Motsinger
(74) *Attorney, Agent, or Firm* — CANTOR COLBURN LLP

(57) ABSTRACT

A character restoration method and apparatus, a storage medium, and an electronic device are provided. The character restoration method includes: a character identifier of a character in a text region is determined, where the character identifier is used for uniquely identifying the character; and encoding is performed at least according to the character identifier, and encoded data is sent to a receiving end, where the encoded data is used for the receiving end to decode the encoded data and restore the character according to the character identifier obtained after decoding, that is, encoding is performed merely according to a small amount of information, and then the information is obtained by decoding, so as to restore the character.

16 Claims, 5 Drawing Sheets

(51) Int. Cl.
   *G06V 10/26* (2022.01)
   *G06F 40/126* (2020.01)
   *G06V 30/19* (2022.01)
   *G06V 30/18* (2022.01)
   *G06V 30/14* (2022.01)

(52) U.S. Cl.
   CPC ........ *G06V 30/1448* (2022.01); *G06V 30/153* (2022.01); *G06V 30/18133* (2022.01); *G06V 30/19093* (2022.01)

(56) References Cited

U.S. PATENT DOCUMENTS

| | | | | |
|---|---|---|---|---|
| 5,703,963 | A * | 12/1997 | Kojima | G06V 30/182 |
| | | | | 382/199 |
| 5,778,095 | A * | 7/1998 | Davies | G06T 9/005 |
| | | | | 382/245 |
| 5,790,701 | A * | 8/1998 | Shijo | G06V 30/182 |
| | | | | 382/197 |
| 5,818,965 | A * | 10/1998 | Davies | G06T 9/005 |
| | | | | 382/245 |
| 2002/0114515 | A1 * | 8/2002 | Hotta | G06V 30/1444 |
| | | | | 382/173 |
| 2007/0030272 | A1 * | 2/2007 | Dowling | G06T 11/20 |
| | | | | 345/467 |
| 2007/0188497 | A1 * | 8/2007 | Dowling | G09G 5/24 |
| | | | | 345/469 |
| 2015/0339525 | A1 * | 11/2015 | Marcelli | G06V 30/226 |
| | | | | 382/161 |
| 2017/0019558 | A1 | 1/2017 | Asahi | |

FOREIGN PATENT DOCUMENTS

| | | |
|---|---|---|
| CN | 103838743 A | 6/2014 |
| CN | 103873877 A | 6/2014 |
| CN | 105472392 A | 4/2016 |
| CN | 106354450 A | 1/2017 |
| JP | 2002232298 A | 8/2002 |

OTHER PUBLICATIONS

European Search Report for corresponding application 20910879.4; Report dated Jun. 14, 2023.

* cited by examiner

CHARACTER RESTORATION METHOD AND APPARATUS, STORAGE MEDIUM, AND ELECTRONIC DEVICE

CROSS REFERENCE

This application is a National Stage Filing of the PCT International Application No. PCT/CN2020/139945 filed on Dec. 28, 2020, which claims priority to Chinese Application No. 201911419859.5 filed on Dec. 31, 2019, the entirety of which is herein incorporated by reference.

TECHNICAL FIELD

The present disclosure relates to the field of communications, and in particular to a character restoration method and apparatus, a storage medium, and an electronic device.

BACKGROUND

With the popularization of cloud computing, virtual desktop and other technologies, a large amount of remote data needs to be transmitted, through networks, to user terminals for display as quickly and clearly as possible. For example, in a common daily office scenario with a cloud desktop, the screen content usually contains a lot of text, which is usually a large amount of repeated printed contents under a font, font size, color, and font style. To maintain visual comfort for the human eye during scanning text on the screen, in a common cloud desktop scenario, the text is compressed using a lossless or approximately lossless compression algorithm. Compression ideas for the text are basically performing compressed encoding based on pixel information of the text, as a result, excessive data flows are transmitted, which influences the data transmission efficiency and the display effect, for example, slow data transmission will cause display stuttering.

There is no good solution to the problem in the related art of excessive data flows caused by lossless compression based on pixel information of text.

SUMMARY

Embodiments of the present disclosure provide a character restoration method and apparatus, a storage medium, and an electronic device, which can at least solve the problem in the related art of excessive data flows caused by lossless compression based on pixel information of text.

According to an embodiment of the present disclosure, a character restoration method is provided, which includes the following operations. A character identifier of a character in a text region is determined, where the character identifier is used for uniquely identifying the character. Encoding is performed at least according to the character identifier, and encoded data is sent to a receiving end, where the encoded data is used for the receiving end to decode the encoded data and restore the character according to the character identifier obtained after decoding.

According to another embodiment of the present disclosure, another character restoration method is also provided, which includes the following operations. Encoded data is received and decoded to at least obtain a character identifier of a character in a text region, where the character identifier is used for uniquely identifying the character. The character is restored according to the character identifier obtained after decoding.

According to another embodiment of the present disclosure, a character restoration apparatus is provided, which includes a determining module and a first sending module. The determining module is configured to determine a character identifier of a character in a text region, where the character identifier is used for uniquely identifying the character.

The first sending module is configured to perform encoding at least according to the character identifier, and send encoded data to a receiving end, where the encoded data is used for the receiving end to decode the encoded data and restore the character according to the character identifier obtained after decoding.

According to another embodiment of the present disclosure, another character restoration apparatus is also provided, which includes a first receiving module and a restoring module. The first receiving module is configured to receive and decode encoded data to at least obtain a character identifier of a character in a text region, where the character identifier is used for uniquely identifying the character.

The restoring module is configured to restore the character according to the character identifier obtained after decoding.

According to yet another embodiment of the present disclosure, a character restoration system is also provided, which includes a sending end and a receiving end. The sending end is configured to perform, after determining a character identifier of a character in a text region, encoding at least according to the character identifier, and send encoded data to the receiving end, where the character identifier is used for uniquely identifying the character. The receiving end is configured to decode the encoded data and restore the character according to the character identifier obtained after decoding.

According to yet another embodiment of the present disclosure, a computer-readable storage medium is also provided, in which a computer program is stored. The computer program is configured to execute, when running, the operations in any above method embodiment.

According to yet another embodiment of the present disclosure, an electronic device is also provided, which includes a memory and a processor. The memory stores a computer program. The processor is configured to run the computer program to execute the operations in any above method embodiment.

By means of the embodiments of the present disclosure, the character identifier of the character in the text region is determined, where the character identifier is used for uniquely identifying the character; and encoding is performed at least according to the character identifier, and the encoded data is sent to the receiving end, where the encoded data is used for the receiving end to decode the encoded data and restore the character according to the character identifier obtained after decoding, that is, encoding is performed merely according to a small amount of information, and then the information is obtained by decoding, so as to restore the character.

BRIEF DESCRIPTION OF THE DRAWINGS

The accompanying drawings described here are used for providing further understanding of the present disclosure, and constitute a part of the present disclosure. Schematic embodiments of the present disclosure and description thereof are used for illustrating the present disclosure and not intended to form an improper limit to the present disclosure. In the accompanying drawings.

DETAILED DESCRIPTION

The present disclosure is elaborated below with reference to the accompanying drawings and embodiments. It is to be noted that the embodiments in the present application and characteristics in the embodiments may be combined without conflicts.

It is to be noted that the terms like "first" and "second" in the specification, claims and accompanying drawings of the present disclosure are used for differentiating the similar objects, but do not have to describe a specific order or a sequence.

Embodiment 1

Figure 1:
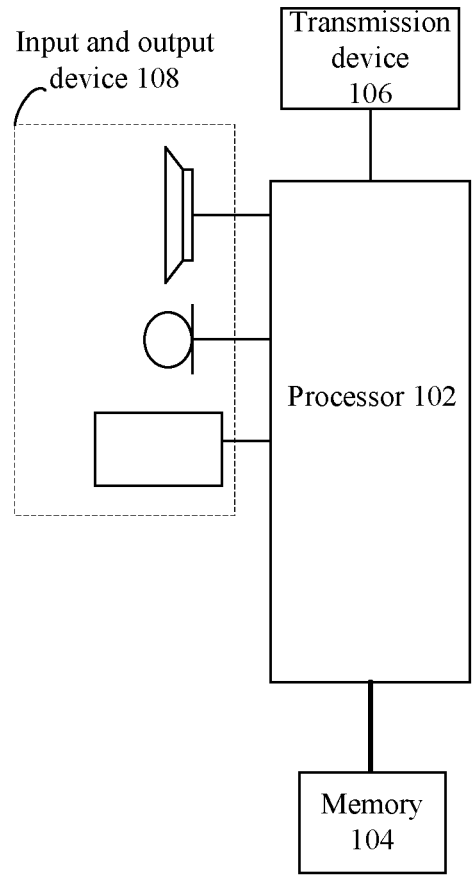
FIG. 1 is a structural block diagram of hardware of a display terminal in a character restoration method according to an embodiment of the present disclosure.

The method embodiment provided by embodiment 1 of the present disclosure may be executed in a display terminal, a mobile terminal, a computer terminal, a conference terminal or similar operating devices. Taking the execution of the method on the display terminal as an example, FIG. 1 is a structural block diagram of hardware of a display terminal in a character restoration method according to an embodiment of the present disclosure. As shown in FIG. 1, the display terminal 10 includes one or more (only one is shown in FIG. 1) processors 102 (the processors 102 may include, but are not limited to, a Micro Processor Unit (MCU) or a Field Programmable Gate Array (FPGA), or other processing devices), a memory 104 configured to store data. In some exemplary implementations, the display terminal may further include a transmission device 106 configured to provide a communication function and an input and output device 108. Those having ordinary skill in the art should know that the structure shown in FIG. 1 is only schematic and not intended to limit the structure of the display terminal. For example, the display terminal 10 may further include more or less components than that in FIG. 1, or has a configuration different from that in FIG. 1.

The memory 104 may be configured to store a computer program, for example, a software program and a module of application software, for example, a computer program corresponding to the character restoration method in the embodiments of the present disclosure. The processor 102 runs the computer program stored in the memory 104, thereby executing various functional applications and data processing, namely implementing the above method. The memory 104 may include a high-speed random access memory and may further include a nonvolatile memory, for example, one or more magnetic storage devices, flash memories or other nonvolatile solid-state memories. In some examples, the memories 104 may further include memories remotely set relative to the processor 102, and these remote memories may be connected to the display terminal 10 through the network. An example of the network includes, but not limited to, the Internet, an Intranet, a local area network, a mobile communication network and a combination thereof.

The transmission device 106 is configured to receive or send data through a network. A specific example of the network may include a wireless network provided by a communication provider of the display terminal 10. In an example, the transmission device 106 includes a Network Interface Controller (NIC), which may be connected with other network devices through a base station, thereby communicating with the Internet. In an example, the transmission device 106 may be a Radio Frequency (RF) module, which is configured to communicate with the Internet in a wireless manner.

Figure 2:
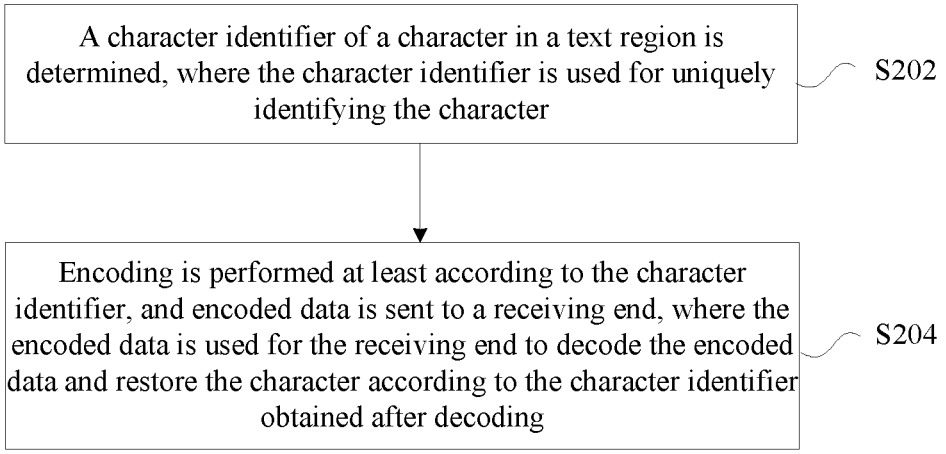
FIG. 2 is a flowchart of a character restoration method according to an embodiment of the present disclosure.

In the present embodiment, a character restoration method running on the display terminal or the computer terminal is provided. FIG. 2 is a flowchart of a character restoration method according to an embodiment of the present disclosure. As shown in FIG. 2, the flow includes the following operations.

At S202, a character identifier of a character in a text region is determined, where the character identifier is used for uniquely identifying the character.

At S204, encoding is performed at least according to the character identifier, and encoded data is sent to a receiving end, where the encoded data is used for the receiving end to decode the encoded data and restore the character according to the character identifier obtained after decoding.

Through the above operations, the character identifier of the character in the text region is determined, where the character identifier is used for uniquely identifying the character; and encoding is performed at least according to the character identifier, and the encoded data is sent to the receiving end, where the encoded data is used for the receiving end to decode the encoded data and restore the character according to the character identifier obtained after decoding, that is, encoding is performed merely according to a small amount of character identifier information, and then the character identifier information is obtained by decoding, so as to restore the character. Therefore, the problem of excessive data flows caused by lossless compression based on pixel information of text can be solved to achieve the technical effects of reducing the size of data flow, thereby improving the data transmission efficiency and then improving the display effect.

In some exemplary implementations, the execution entity of the above operations may be, but not limited to, a terminal.

In some exemplary implementations, the operation that the character identifier of the character in the text region is determined may include that: a character feature of the character in the text region is extracted as the character identifier, where the character feature includes a character height of the character, a character width of the character, and a character pixel matrix distribution of the character. Or, the operation that the character identifier of the character in the text region is determined may include that: a character feature of the character in the text region is extracted, where the character feature includes a character height of the character, a character width of the character, and a character pixel matrix distribution of the character; and matching is performed in preset character feature information according to the character feature, an index of the character feature of the character in the character feature information is determined, and the index of the character feature is taken as the character identifier.

It is to be noted that the character identifier is mainly used for uniquely identifying a character. The character identifier may be the extracted character feature of the character or the corresponding index of the character feature in a preset character information base, which may be, for example, a corresponding index in a character information base cached in advance. Because transmission resources required for transmission of encoded character identifier are far less than that consumed by performing lossless compression on the text in the related art, the transmission burden is greatly reduced. Moreover, after the character identifier is decoded by the data receiving end, the data receiving end may also obtain the character represented by the character identifier according to the same preset character information bases, then fill the character according to rendering information of the character, and finally restore the same character as the character displayed on the sending end.

In some exemplary implementations, the operation that the matching is performed in preset character feature information according to the character feature, and the index of the character feature of the character in the character feature information is determined may include the following operations. Matching is performed in specified character features in the character feature information according to the character feature of the character until a complete character feature of the character is matched, where the specified character features include character features with a height the same as the character height of the character, a width greater than or equal to the character width of the character, and a pixel matrix distribution the same as the character pixel matrix distribution of the character. The index of the complete character feature in the character feature information is determined according to the matched complete character feature.

In some exemplary implementations, the encoded data is further used for instructing the receiving end to determine, after decoding the encoded data, rendering information of the character according to the character identifier obtained after decoding, and restore the character according to the rendering information. The rendering information is preset.

In some exemplary implementations, the method may further include that: encoding is performed according to character position information of the character in the text region, and the encoded data is sent to the receiving end, where the encoded data is also used for the receiving end to decode the encoded data and determine a position of the character according to the character position information obtained after decoding.

It is to be noted that position information of the character may also be carried in the encoded data, and then the data receiving end may obtain the position information of the character by decoding, so that the position of the character is restored on the receiving end. In this way, the text display on the data sending end has basically the same typography as the text display on the data receiving end.

In some exemplary implementations, before the character identifier of the character in the text region is determined, the method may further include that: the text region in an image is recognized; and characters in the text region are split to obtain multiple single characters.

Figure 3:
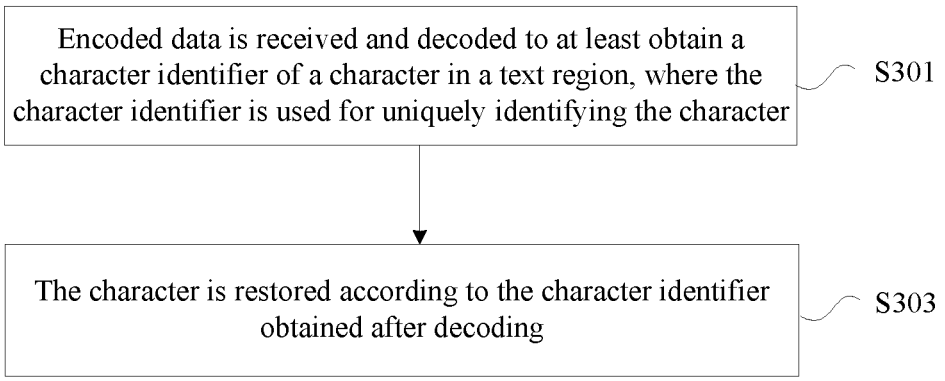
FIG. 3 is a flowchart of another character restoration method according to an embodiment of the present disclosure.

The present embodiment also provides a character restoration method, which may be applied to a data receiving end, for example, a receiving end with a decoding function. FIG. 3 is a flowchart of another character restoration method according to an embodiment of the present disclosure. As shown in FIG. 3, the method includes the following operations.

At S301, encoded data is received and decoded to at least obtain a character identifier of a character in a text region, where the character identifier is used for uniquely identifying the character.

At S303, the character is restored according to the character identifier obtained after decoding.

Through the above operations, the encoded data is received and decoded to at least obtain the character identifier of the character in the text region, where the character identifier is used for uniquely identifying the character; and the character is restored according to the character identifier obtained after decoding, that is, encoding is performed merely according to a small amount of character identifier information, and then the character identifier information is obtained by decoding, so as to restore the character. Therefore, the problem of excessive data flows caused by lossless compression based on pixel information of text can be solved to achieve the technical effects of reducing the size of data flow, thereby improving the data transmission efficiency and then improving the display effect.

It is to be noted that the encoded data carries the character identifier of the character in the text region.

In some exemplary implementations, the character identifier is a character feature of the character in the text region, where the character feature includes a character height of the character, a character width of the character, and a character pixel matrix distribution of the character; or the character identifier is an index of a character feature of the character in the preset character feature information, where the character feature includes a character height of the character, a character width of the character, and a character pixel matrix distribution of the character.

In some exemplary implementations, the index of the character feature of the character in the preset character feature information is determined in a following way: matching is performed in specified character features in the character feature information according to the character feature of the character until a complete character feature of the character is matched, where the specified character features include character features with a height the same as the character height of the character, a width greater than or equal to the character width of the character, and a pixel matrix distribution the same as the character pixel matrix distribution of the character; and the index of the complete character feature in the character feature information is determined according to the matched complete character feature.

In some exemplary implementations, the operation that the character is restored according to the character identifier obtained after decoding may include that: after the encoded data is decoded, rendering information of the character is determined according to the character identifier obtained after decoding, and the character is restored according to the rendering information. The rendering information is preset.

In some exemplary implementations, the method may further include that: the encoded data is received and decoded to obtain character position information of the character in the text region; and a position of the character is determined according to the character position information obtained after decoding. It is to be noted that the encoded data carries the character position information of the character in the text region.

In the present embodiment, a character restoration apparatus is also provided, which is configured to implement the above embodiments and exemplary implementations. The embodiments and exemplary implementations that have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 4:
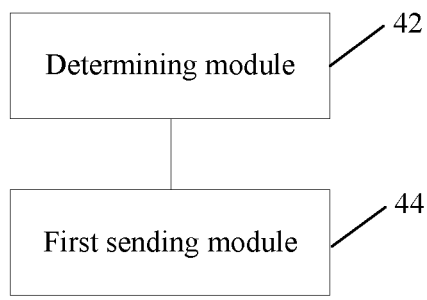
FIG. 4 is a structural block diagram of a character restoration apparatus according to an embodiment of the present disclosure.

FIG. 4 is a structural block diagram of a character restoration apparatus according to an embodiment of the present disclosure. As shown in FIG. 4, the apparatus includes: a determining module 42 and a first sending module 44.

The determining module 42 is configured to determine a character identifier of a character in a text region, where the character identifier is used for uniquely identifying the character.

The first sending module 44 is configured to perform encoding at least according to the character identifier, and send encoded data to a receiving end, where the encoded data is used for the receiving end to decode the encoded data and restore the character according to the character identifier obtained after decoding.

Through the above operations, the character identifier of the character in the text region is determined, where the character identifier is used for uniquely identifying the character; and encoding is performed at least according to the character identifier, and the encoded data is sent to the receiving end, where the encoded data is used for the receiving end to decode the encoded data and restore the character according to the character identifier obtained after decoding, that is, encoding is performed merely according to a small amount of character identifier information, and then the character identifier information is obtained by decoding, so as to restore the character. Therefore, the problem of excessive data flows caused by lossless compression based on pixel information of text can be solved to achieve the technical effects of reducing the size of data flow, thereby improving the data transmission efficiency and then improving the display effect.

In some exemplary implementations, the determining module includes: an extracting module, configured to extract a character feature of the character in the text region as the character identifier, where the character feature includes a character height of the character, a character width of the character, and a character pixel matrix distribution of the character.

In some exemplary implementations, the determining module alternatively includes: an extracting module and a matching module.

The extracting module is configured to extract a character feature of the character in the text region, where the character feature includes a character height of the character, a character width of the character, and a character pixel matrix distribution of the character.

The matching module is configured to perform matching in the preset character feature information according to the character feature, determine an index of the character feature of the character in the character feature information, and take the index of the character feature as the character identifier.

In some exemplary implementations, the matching module includes: a matching submodule and a determining submodule.

The matching submodule is configured to perform matching in specified character features in the character feature information according to the character feature of the character until a complete character feature of the character is matched, where the specified character features include character features with a height the same as the character height of the character, a width greater than or equal to the character width of the character, and a pixel matrix distribution the same as the character pixel matrix distribution of the character.

The determining submodule is configured to determine the index of the complete character feature in the character feature information according to the matched complete character feature.

In some exemplary implementations, the encoded data is further used for instructing the receiving end to determine, after decoding the encoded data, rendering information of the character according to the character identifier obtained after decoding, and restore the character according to the rendering information. The rendering information is preset.

In some exemplary implementations, the apparatus may further include: a second sending module, configured to perform encoding according to the character position information of the character in the text region, and send encoded data to the receiving end, where the encoded data is also used for the receiving end to decode the encoded data and determine a position of the character according to the character position information obtained after decoding.

In some exemplary implementations, the apparatus may further include: a recognizing module and a splitting module. The recognizing module is configured to recognize the text region in an image before determining the character identifier of the character in the text region. The splitting module is configured to split characters in the text region to obtain multiple single characters.

In the present embodiment, another character restoration apparatus is also provided, which is configured to implement the above embodiments and exemplary implementations. The embodiments and exemplary implementations that have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 5:
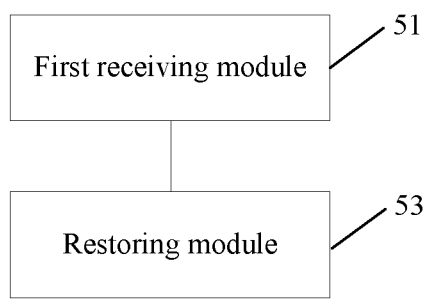
FIG. 5 is a structural block diagram of another character restoration apparatus according to an embodiment of the present disclosure.

FIG. 5 is a structural block diagram of another character restoration apparatus according to an embodiment of the present disclosure. As shown in FIG. 5, the apparatus includes: a first receiving module 51 and a restoring module 53.

The first receiving module 51 is configured to receive and decode encoded data to at least obtain a character identifier of a character in a text region, where the character identifier is used for uniquely identifying the character.

The restoring module 53 is configured to restore the character according to the character identifier obtained after decoding.

Through the above operations, the encoded data is received and decoded to at least obtain the character identifier of the character in the text region, where the character identifier is used for uniquely identifying the character; and the character is restored according to the character identifier obtained after decoding, that is, encoding is performed merely according to a small amount of character identifier information, and then the character identifier information is obtained by decoding, so as to restore the character. Therefore, the problem of excessive data flows caused by lossless compression based on pixel information of text can be solved to achieve the technical effects of reducing the size of data flow, thereby improving the data transmission efficiency and then improving the display effect.

In some exemplary implementations, the character identifier is a character feature of the character in the text region, where the character feature includes a character height of the character, a character width of the character, and a character pixel matrix distribution of the character; or the character identifier is an index of a character feature of the character in preset character feature information, where the character feature includes a character height of the character, a character width of the character, and a character pixel matrix distribution of the character.

In some exemplary implementations, the index of the character feature of the character in the preset character feature information is determined in a following way: matching is performed in specified character features in the character feature information according to the character feature of the character until a complete character feature of the character is matched, where the specified character features include character features with a height the same as the character height of the character, a width greater than or equal to the character width of the character, and a pixel matrix distribution the same as the character pixel matrix distribution of the character; and the index of the complete character feature in the character feature information is determined according to the matched complete character feature.

In some exemplary implementations, the restoring module includes: a restoring submodule, configured to determine, after decoding the encoded data, rendering information of the character according to the character identifier obtained after decoding, and restore the character according to the rendering information. The rendering information is preset.

In some exemplary implementations, the apparatus may further include: a second receiving module and a determining module. The second receiving module is configured to receive and decode encoded data to obtain character position information of the character in the text region. The determining module is configured to determine a position of the character according to the character position information obtained after decoding.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

The embodiments of the present disclosure also provide a character restoration system, which includes: a sending end and a receiving end. The sending end is configured to, after determining a character identifier of a character in a text region, perform encoding at least according to the character identifier, and send encoded data to the receiving end, where the character identifier is used for uniquely identifying the character. The receiving end is configured to decode the encoded data and restore the character according to the character identifier obtained after decoding.

It is to be noted that, for exemplary implementations of the present embodiment, reference can be made to other implementations of the present embodiment. Elaborations are omitted herein.

Exemplary Implementation

The embodiments of the present disclosure provide an encoding mode for a text region of the content to be encoded on a screen, which is used for solving the problem of low text compression ratio in the current applications required to transmit a large number of text pixels, so as to achieve low bandwidth, low complexity and high definition in virtual desktop, secondary stream sharing in video conference, IPTV and other applications.

The technical idea of the embodiments of the present disclosure is that: a text region of the content to be encoded on a screen is recognized and clustered, line distribution features of the clustered text region are recognized and split, and then the characters in each natural text line are split and extracted; after that, the character feature information after splitting is matched with the characters in the cache, and then the matched information in the cache and the pixel information in the unmatched region are compressed to restore the original pixel rendering of the characters on a client.

Figure 6:
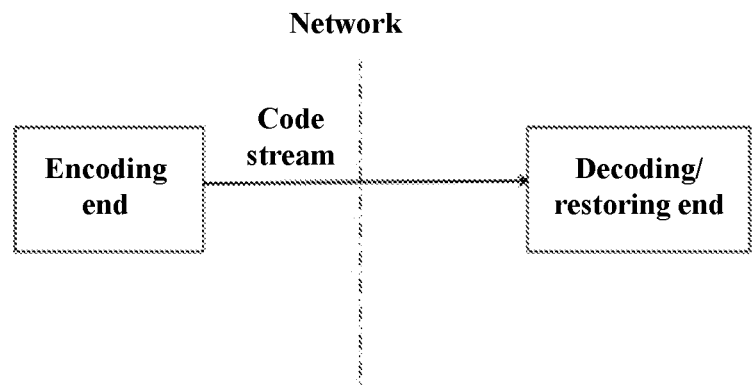
FIG. 6 is a structural schematic diagram of a text compression system based on pixel features according to an exemplary implementation of the present disclosure.
Figure 7:
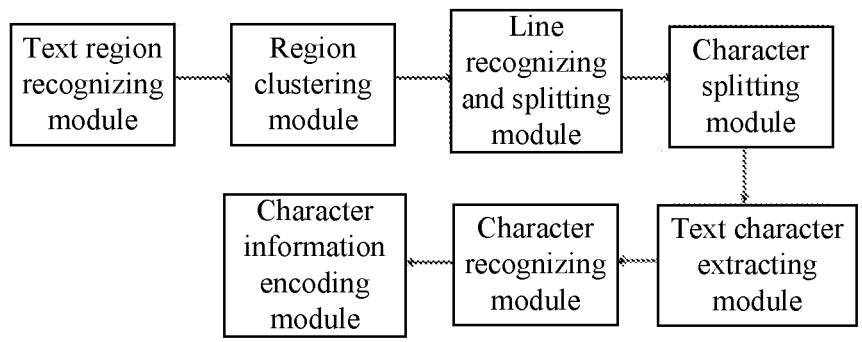
FIG. 7 is a structural block diagram of an encoding end according to an exemplary implementation of the present disclosure.

The embodiments of the present disclosure describe a text compression method and system based on pixel features. FIG. 6 is a structural schematic diagram of a text compression system based on pixel features according to an exemplary implementation of the present disclosure. As shown in FIG. 6, the text compression system based on pixel features described in the embodiments of the present disclosure includes the following structure: an encoding end and a decoding end (or restoring end). The encoding end sends a code stream to the decoding end after encoding. FIG. 7 is a structural block diagram of an encoding end according to an exemplary implementation of the present disclosure. As shown in FIG. 7, the encoding end includes: a text and image region recognizing module, a text clustering module, a text line feature analyzing and splitting module, a character splitting module, a character feature analyzing and extracting module, a text character recognizing module, and an encoding module.

The text and image region recognizing module is configured to recognize a text region and an image region in the changed content of each frame. Distinguishing the two regions aims to use different encoded compression methods.

The text clustering module is configured to cluster the text regions with the similar background color into a large consecutive region, so as to facilitate the splitting and recognition of the text.

The text line feature analyzing and splitting module is configured to split the clustered text region into natural text lines for subsequent text splitting and recognition.

The character splitting module is configured to split the natural text lines into single characters for subsequent character feature analysis and extraction. This module is a new module.

The character feature analyzing and extracting module is configured to extract the character feature for the split single character for subsequent matching with the characters in the cache. The module is a new module.

The text character recognizing module is configured to match the extracted character feature with the character features in the cache to find the matched character information for subsequent compression. The module is a new module.

The encoding module is configured to compress and encode the matched character information and the remaining pixel information respectively for the restoration of the decoding end. The encoded compression of the matched character information is added in the module.

Figure 8:
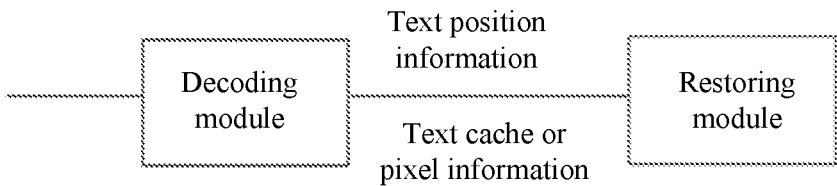
FIG. 8 is a structural block diagram of a decoding end according to an exemplary implementation of the present disclosure.

FIG. 8 is a structural block diagram of a decoding end according to an exemplary implementation of the present disclosure. As shown in FIG. 8, the decoding end includes a data decoding module and a data restoring module.

The data decoding module is responsible for decoding the received code stream transmitted by the encoding end. The decoding of the matched data of the character is added in the data decoding module.

The data restoring module determines according to the decoded data whether the original character pixel in the corresponding cache needs to be filled according to the matched information. The restoration of the original character pixel is added in the data restoring module.

The text compression method based on pixel features in the embodiments of the present disclosure includes the following operations.

At the first operation, for the changing screen content of each frame, regional distributions of text content are recognized based on pixel distribution features of each region, including the gradient information of pixels, the type information of pixels, and the degree of approximation of main pixels.

At the second operation, the above detected text regions are clustered according to the value of the background color, so that the text regions with the similar background color are clustered into one or several large consecutive regions.

At the third region, for the above text regions clustered based on the background color, some methods are used to analyze line distribution information of the text in the regions, and the pixels in each text region are split according to the natural line.

At the fourth operation, for each single text region, simple character splitting is performed on each line of the recognized text content. The main methods are vertical histogram projection method and local extremum method. The character splitting is not required to be completely accurate.

At the fifth operation, the characters preliminarily split are matched in the cache according to split results from left to right. The characters and scattered pixels for which no matching is found in the cache may be compressed using the existing lossless algorithm in the encoding module.

The data compressed according to the above method is input to a lossless encoding algorithm for compression and transmission.

Compared to the related art, the method and apparatus described in the embodiments of the present disclosure can significantly improve the compression efficiency of cloud desktop, sharing secondary stream in video conference, IPTV and other use scenarios requiring the transmission of a large number of text pixels, thereby improving the fluency of applications.

In order to further elaborate the technical means adopted by the present disclosure to achieve a predetermined purpose and the efficacy thereof, the compression method presented in the embodiment of the present disclosure is described in detail below in combination with the accompanying drawings.

First, before the cloud desktop runs, the common character, font, font size, font style, color, font rendering, etc. in the operating system are analyzed, and unique and distinguishable feature information and character rendering pixel matrix data is generated for each combination and loaded into a process when a server and a client of the cloud desktop start up to match and recognize the characters during the use of the cloud desktop.

The feature information of the character may include the width w and height h of the character. The cumulative value of the character pixels in the vertical direction in a width range from 0 to w is represented by array sum1. The cumulative value of the character pixels in the horizontal direction in a height range from 0 to h is represented by array sum2. The feature information may further include the matrix distribution matrix of the character pixels in the w*h matrix (the w*h matrix formed according to background 0 and text pixel 1). With the feature information, the unique and distinguishable feature information under different characters, fonts, font sizes, font styles, colors and rendering modes may be realized, and the meanings of the subsequent feature values sum1, sum2 and matrix are all corresponding here.

The character rendering pixel matrix data is used for restoring the data on the decoding end.

A text compression transmission scheme includes an encoding end module and a decoding end module. Descriptions are given below respectively from the encoding end and the decoding end.

Figure 9:
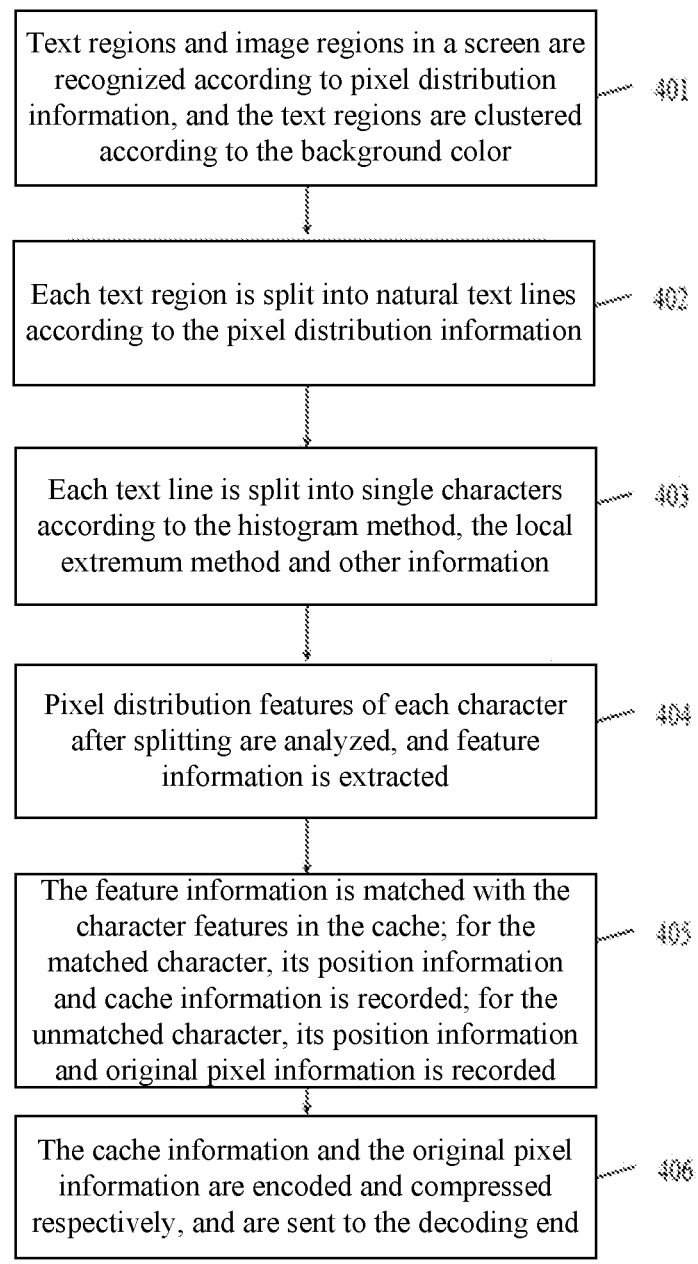
FIG. 9 is a flowchart of a method on an encoding end according to an exemplary implementation of the present disclosure.

FIG. 9 is a flowchart of a method on an encoding end according to an exemplary implementation of the present disclosure. As shown in FIG. 9, the flow on the encoding end includes the following operations.

At S401, for the changing region of the desktop, the text regions and the image regions are selected according to the gradient feature of pixel distribution of the original screen data and pixel color information, such as the type of pixel color and the degree of approximation of top2 pixels, and the text regions are clustered according to the degree of approximation of the background color to provide the reliability for the next line feature analysis.

Figure 10:
FIG. 10 is a schematic diagram of text splitting according to an exemplary implementation of the present disclosure.

At S402, for each clustered text region in S401, the real distribution of the text lines is accurately recognized by using the histogram projection method and the local extremum method. FIG. 10 is a schematic diagram of text splitting according to an exemplary implementation of the present disclosure. Seeing line 1 (Line1) and line 4 (Line4) in FIG. 10, Line1 is the upper border line of the line and Line4 is the lower border line of the line. The histogram projection method and the local extremum method are mature in the conventional art and will not be expanded in detail.

At S403, based on each natural text line extracted in S402, a single character is split according to the vertical histogram projection method and the local extremum method or combined with a connected domain. The vertical histogram projection method, the local extremum method and connected domain calculation used in this operation are existing technologies and will not be expanded in detail. For a character splitting effect, refer to the vertical lines in FIG. 10. The width w' of each character is obtained. It is important to note that the character split in this operation are not required to be completely accurate, but may be over split.

At S404, based on the characters preliminarily split in S403, the real upper and lower border positions of the character are extracted according to a foreground color distribution. The upper border of the character A in FIG. 10 is Line1, and the lower border is line 3 (Line3), the feature value of the height h' of the character is obtained, and then the feature information like array sum1', array sum2', and the matrix matrix' in the range of w'*h' is calculated.

At S405, the feature information like h', w', sum1', sum2' and matrix' extracted in S404 is matched with character cache information already loaded in the cache. It is to be noted here that other feature values except the feature value h' of the character preliminarily split may only be local information in the complete character, so the character may be matched in the range where h'=h and w'≤w, and it is required that in the range of 0 to w', sum1'[i]=sum[1], and in the range of 0 to h', [i]≤sum2[i], at the same time, matrix'[i][j]=matrix[i][j].

Based on the above requirements, the characters over split in S402 are integrated according to the matched complete character until w'=w, sum1'=sum1, sum2'=sum2, and matrix'=matrix, and the character matching is ended; at this point, the starting coordinates of the upper-left corner of the character are recorded, and the index value index corresponding to the character is matched in the cache for subsequent encoding; otherwise, the character matching is failed, and it is necessary to record the coordinates of the upper-left corner of the character, the character width and height, and the original pixels of the character for subsequent encoding.

At S406, the coordinate information and index extracted from the matched character in S405 are compressed and encapsulated, the coordinate information and original pixel information of the unmatched character is compressed and encapsulated, and then sent to a remote end for decoding. In this operation, the matched data and the unmatched data need to be distinguished for the decoding end to recognize.

Figure 11:
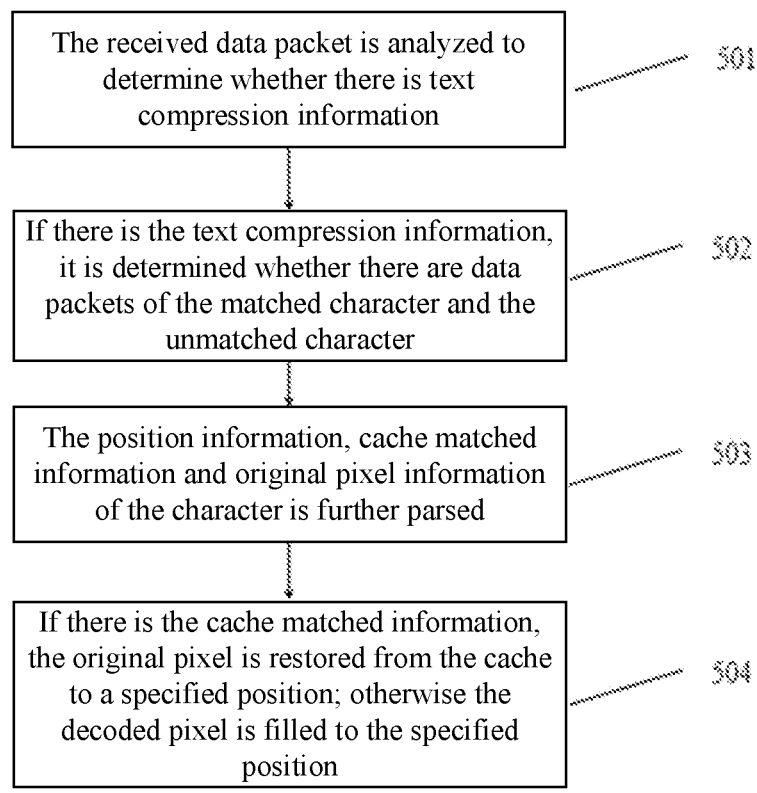
FIG. 11 is a flowchart of a method on a decoding end according to an exemplary implementation of the present disclosure.

FIG. 11 is a flowchart of a method on an decoding end according to an exemplary implementation of the present disclosure. As shown in FIG. 11, the flow on the decoding end includes the following operations.

At S501, the decoding end first analyzes the type of a code stream packet transmitted by the encoding end and determines whether the current packet includes a data packet of lossless compression type; if so, it is indicated that there is text compression information; or else, analysis and restoration of a text packet is not involved.

At S502, the type of text compression is further analyzed to determine whether there are data packets of the matched character and the unmatched character.

At S503, for the analysis result in S502, if there is the data packet of the matched character, the coordinates of the upper-left corner of the matched character and the corresponding index value in the cache are parsed; if there is the data packet of the unmatched character, the position information, size information and original pixel value of the character are parsed.

At S504, based on S503, the original pixel of the matched character is extracted from the cache and filled to the corresponding position, while the unmatched character is directly filled according to the pixel value and coordinate information after decoding. This operation completes the restoration of the text pixel.

Through the above description of implementations, those having ordinary skill in the art may clearly know that the method according to the above embodiments may be implemented by means of software plus a necessary common hardware platform, certainly by means of hardware; but in many cases, the former is the better implementation. Based on this understanding, the technical solution of the present disclosure substantially or the part making a contribution to the prior art can be embodied in the form of software product; the computer software product is stored in a storage medium (for example, a Read-Only Memory (ROM)/Random Access Memory (RAM), a magnetic disk, and a compact disc) and includes a number of instructions to make a terminal device (which can be a cell phone, a personal computer, a server or a network device, etc.) perform all or part of the method in each embodiment of the present disclosure.

An embodiment of the present disclosure also provides a computer-readable storage medium, in which a computer program is stored. The computer program is configured to perform, when running, the operations in any of the above method embodiments.

In some exemplary implementations of the present embodiment, the computer-readable storage medium may be configured to store a computer program for executing the following operations.

At S1, the character identifier of the character in the text region is determined, where the character identifier is used for uniquely identifying the character.

At S2, encoding is performed at least according to the character identifier, and the encoded data is sent to the receiving end, where the encoded data is used for the receiving end to decode the encoded data and restore the character according to the character identifier obtained after decoding.

Through the above operations, the character identifier of the character in the text region is determined, where the character identifier is used for uniquely identifying the character; and encoding is performed at least according to the character identifier, and the encoded data is sent to the receiving end, where the encoded data is used for the receiving end to decode the encoded data and restore the character according to the character identifier obtained after decoding, that is, encoding is performed merely according to a small amount of character identifier information, and then the character identifier information is obtained by decoding, so as to restore the character. Therefore, the problem of excessive data flows caused by lossless compression based on pixel information of text can be solved to achieve the technical effects of reducing the size of data flow, thereby improving the data transmission efficiency and then improving the display effect.

Optionally, the specific examples in the present embodiment may refer to the examples described in the above embodiments and alternative embodiments.

In some exemplary implementations of the present embodiment, the storage media include, but not limited to, a USB flash disk, a Read-Only Memory (ROM), a Random Access Memory (RAM), a mobile hard disk, a magnetic disk, a compact disc, and other media capable of storing the computer program.

An embodiment of the present disclosure also provides an electronic device, which includes a memory and a processor. The memory stores a computer program. The processor is configured to run the computer program to execute the operations in any above method embodiment.

In some exemplary implementations, the electronic device may further include a transmission device and an input/output device. The transmission device is connected with the processor, and the input/output device is connected with the processor.

In some exemplary implementations of the present embodiment, the processor may be configured to execute the following operations through the computer program.

At S1, the character identifier of the character in the text region is determined, where the character identifier is used for uniquely identifying the character.

At S2, encoding is performed at least according to the character identifier, and the encoded data is sent to the receiving end, where the encoded data is used for the receiving end to decode the encoded data and restore the character according to the character identifier obtained after decoding.

Through the above operations, the character identifier of the character in the text region is determined, where the character identifier is used for uniquely identifying the character; and encoding is performed at least according to the character identifier, and the encoded data is sent to the receiving end, where the encoded data is used for the receiving end to decode the encoded data and restore the character according to the character identifier obtained after decoding, that is, encoding is performed merely according to a small amount of character identifier information, and then the character identifier information is obtained by decoding, so as to restore the character. Therefore, the problem of excessive data flows caused by lossless compression based on pixel information of text can be solved to achieve the technical effects of reducing the size of data flow, thereby improving the data transmission efficiency and then improving the display effect.

Optionally, the specific examples in the present embodiment may refer to the examples described in the above embodiments and alternative embodiments.

An embodiment of the present disclosure also provides a computer-readable storage medium, in which a computer program is stored. The computer program is configured to perform, when running, the operations in any of the above method embodiments.

In some exemplary implementations of the present embodiment, the computer-readable storage medium may be configured to store a computer program for executing the following operations.

At S1, encoded data is received and decoded to at least obtain the character identifier of the character in the text region, where the character identifier is used for uniquely identifying the character.

At S2, the character is restored according to the character identifier obtained after decoding.

Through the above operations, the encoded data is received and decoded to at least obtain the character identifier of the character in the text region, where the character identifier is used for uniquely identifying the character; and the character is restored according to the character identifier obtained after decoding, that is, encoding is performed merely according to a small amount of character identifier information, and then the character identifier information is obtained by decoding, so as to restore the character. Therefore, the problem of excessive data flows caused by lossless compression based on pixel information of text can be solved to achieve the technical effects of reducing the size of data flow, thereby improving the data transmission efficiency and then improving the display effect.

Optionally, the specific examples in the present embodiment may refer to the examples described in the above embodiments and alternative embodiments.

In some exemplary implementations of the present embodiment, the storage media include, but not limited to, a USB flash disk, a Read-Only Memory (ROM), a Random Access Memory (RAM), a mobile hard disk, a magnetic disk, a compact disc, and other media capable of storing the computer program.

An embodiment of the present disclosure also provides an electronic device, which includes a memory and a processor. The memory stores a computer program. The processor is configured to run the computer program to execute the operations in any above method embodiment.

In some exemplary implementations, the electronic device may further include a transmission device and an input/output device. The transmission device is connected with the processor, and the input/output device is connected with the processor.

In some exemplary implementations of the present embodiment, the processor may be configured to execute the following operations through the computer program.

At S1, encoded data is received and decoded to at least obtain the character identifier of the character in the text region, where the character identifier is used for uniquely identifying the character.

At S2, the character is restored according to the character identifier obtained after decoding.

Through the above operations, the encoded data is received and decoded to at least obtain the character identifier of the character in the text region, where the character identifier is used for uniquely identifying the character; and the character is restored according to the character identifier obtained after decoding, that is, encoding is performed merely according to a small amount of character identifier information, and then the character identifier information is obtained by decoding, so as to restore the character. Therefore, the problem of excessive data flows caused by lossless compression based on pixel information of text can be solved to achieve the technical effects of reducing the size of data flow, thereby improving the data transmission efficiency and then improving the display effect.

Optionally, the specific examples in the present embodiment may refer to the examples described in the above embodiments and alternative embodiments.

It is apparent that those having ordinary skill in the art should appreciate that the above modules and operations of the present disclosure may be implemented by a general-purpose computing device, and they may be centralized in a single computing device or distributed on a network composed of multiple computing devices; in some exemplary implementations, they may be implemented by a program code which is capable of being executed by the computing device, so that they may be stored in a storage device and executed by the computing device; and in some situations, the presented or described operations may be executed in an order different from that described here; or they are made into integrated circuit modules, respectively; or multiple modules and operations of them are made into a single integrated circuit module to realize. Therefore, the present disclosure is not limited to any particular combination of hardware and software.

The above is only the exemplary embodiments of the present disclosure and not intended to limit the present disclosure; for those having ordinary skill in the art, the present disclosure may have various modifications and changes. Any modifications, equivalent replacements, improvements and the like within the principle of the present disclosure should fall within the protection scope of the claims of the present disclosure.

What is claimed is:

1. A character restoration method, comprising:
determining a character identifier of a character in a text region, wherein the character identifier is used for uniquely identifying the character; and
performing encoding at least according to the character identifier, and sending encoded data to a receiving end, wherein the encoded data is used for the receiving end to decode the encoded data and restore the character according to the character identifier obtained after decoding;
wherein determining the character identifier of the character in the text region comprises:
extracting a character feature of the character in the text region, wherein the character feature comprises a character height of the character, a character width of the character, and a character pixel matrix distribution of the character; and
performing matching in preset character feature information according to the character feature, determining an index of the character feature of the character in the character feature information, and taking the index of the character feature as the character identifier;
wherein performing matching in the preset character feature information according to the character feature, and determining the index of the character feature of the character in the character feature information comprises:
performing matching in specified character features in the character feature information according to the character feature of the character until a complete character feature of the character is matched, wherein the specified character features comprise: character features with a height the same as the character height of the character, a width greater than or equal to the character width of the character, and a pixel matrix distribution the same as the character pixel matrix distribution of the character; and
determining the index of the complete character feature in the character feature information according to the matched complete character feature.

2. The method according to claim 1, wherein the encoded data is further used for instructing the receiving end to determine, after decoding the encoded data, rendering information of the character according to the character identifier obtained after decoding, and to restore the character according to the rendering information, wherein the rendering information is preset.

3. The method according to claim 1, further comprising:
performing encoding according to character position information of the character in the text region, and sending encoded data to the receiving end, wherein the encoded data is further used for the receiving end to decode the encoded data and determine a position of the character according to the character position information obtained after decoding.

4. The method according to claim 1, wherein before determining the character identifier of the character in the text region, the method further comprises:
recognizing the text region in an image; and
splitting characters in the text region to obtain multiple single characters.

5. A character restoration method, comprising:
receiving and decoding encoded data to at least obtain a character identifier of a character in a text region, wherein the character identifier is used for uniquely identifying the character; and
restoring the character according to the character identifier obtained after decoding;
wherein the character identifier is an index of a character feature of the character in preset character feature information, wherein the character feature comprises a character height of the character, a character width of the character, and a character pixel matrix distribution of the character;
wherein the index of the character feature of the character in the preset character feature information is determined in a following way:
performing matching in specified character features in the character feature information according to the character feature of the character until a complete character feature of the character is matched, wherein the specified character features comprise: character features with a height the same as the character height of the character, a width greater than or equal to the character width of the character, and a pixel matrix distribution the same as the character pixel matrix distribution of the character; and
determining the index of the complete character feature in the character feature information according to the matched complete character feature.

6. The method according to claim 5, wherein restoring the character according to the character identifier obtained after decoding comprises:
after decoding the encoded data, determining rendering information of the character according to the character identifier obtained after decoding, and restoring the character according to the rendering information, wherein the rendering information is preset.

7. The method according to claim 5, further comprising:
receiving and decoding the encoded data to obtain character position information of the character in the text region; and
determining a position of the character according to the character position information obtained after decoding.

8. A character restoration apparatus, comprising a memory storing instructions and a processor in communication with the memory, wherein the processor is configured to execute the instructions to perform the method according to claim 1.

9. A character restoration apparatus, comprising a memory storing instructions and a processor in communication with the memory, wherein the processor is configured to execute the instructions to perform the method according to claim 5.

10. A character restoration system, comprising: a sending end and a receiving end, wherein the sending end is configured to perform, after determining a character identifier of a character in a text region, encoding at least according to the character identifier, and send encoded data to the receiving end, wherein the character identifier is used for uniquely identifying the character;
the receiving end is configured to decode the encoded data and restore the character according to the character identifier obtained after decoding;
wherein the sending end is also configured to perform, extracting a character feature of the character in the text region, wherein the character feature comprises a character height of the character, a character width of the character, and a character pixel matrix distribution of the character; and performing matching in preset character feature information according to the character feature, determining an index of the character feature of the character in the character feature information, and taking the index of the character feature as the character identifier;

wherein the sending end is also configured to perform, performing matching in specified character features in the character feature information according to the character feature of the character until a complete character feature of the character is matched, wherein the specified character features comprise: character features with a height the same as the character height of the character, a width greater than or equal to the character width of the character, and a pixel matrix distribution the same as the character pixel matrix distribution of the character; and determining the index of the complete character feature in the character feature information according to the matched complete character feature.

11. A non-transitory computer-readable storage medium, in which a computer program is stored, wherein the computer program is configured to execute, when running on a processor, the method according to claim 1.

12. An electronic device, comprising a memory and a processor, wherein the memory stores a computer program, and the processor is configured to run the computer program, so as to execute the method according to claim 1.

13. The method according to claim 1, wherein determining the character identifier of the character in the text region comprises:

extracting a character feature of the character in the text region as the character identifier, wherein the character feature comprises a character height of the character, a character width of the character, and a character pixel matrix distribution of the character.

14. The method according to claim 5, wherein the character identifier is a character feature of the character in the text region, wherein the character feature comprises a character height of the character, a character width of the character, and a character pixel matrix distribution of the character.

15. A non-transitory computer-readable storage medium, in which a computer program is stored, wherein the computer program is configured to execute, when running on a processor, the method according to claim 5.

16. An electronic device, comprising a memory and a processor, wherein the memory stores a computer program, and the processor is configured to run the computer program, so as to execute the method according to claim 5.

* * * * *